UNITED STATES PATENT OFFICE 2,530,650

METAL DEACTIVATOR

Joseph A. Chenicek, Riverside, Ill., assignor to Universal Oil Products Company, Chicago, Ill., a corporation of Delaware No Drawing. Application April 16, 1947,
Serial No. 741,938

2 Claims. (Cl. 44—73)

The present invention relates to a method of stabilizing organic compounds, and particularly to the stabilization of organic substances against deterioration by oxygen catalyzed in the presence of or by contact with certain oxidation promoters. While the present invention is applicable to preventing such deterioration of fats, edible oils, lubricating oils, rubber, etc., it is particularly applicable to the stabilization of olefin-containing hydrocarbon distillates, such as cracked or polymer gasolines.

One method of refining gasoline is the copper sweetening process, in which process the gasoline is contacted with a copper-containing reagent. As a result of this treatment, the sweetened gasoline usually contains relatively small amounts of copper compounds which have a catalytic effect on oxidation reactions which occur when the gasoline comes in contact with air. In addition, gasolines come in contact with various metals in the course of refining, storing and shipping operations, and the metal may catalyze the oxidation reactions. In some cases, this may also result in the gasoline containing minor amounts of such metals as copper, iron, cobalt, nickel, chromium, lead, etc., which have a detrimental effect on the stability of the gasoline.

In one embodiment the present invention relates to a method of stabilizing an organic substance subject to oxidative deterioration, which comprises adding thereto a metal deactivator prepared by condensing an ortho-hydroxy aromatic aldehyde with an aziridine of the structure shown below

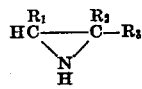

where $R_1$, $R_2$ and $R_3$ are chosen from among H, alkyl, aryl, alkaryl, aralkyl and cycloalkyl groups.

In a specific embodiment the present invention relates to a method of stabilizing cracked gasoline containing copper, which comprises adding thereto a metal deactivator prepared by condensing salicylaldehyde with ethylene imine, in an amount sufficient to suppress the catalytic effect of said copper.

The metal deactivators of the present invention are readily prepared by condensing an ortho-hydroxy aromatic aldehyde with an aziridine. The preferred ortho-hydroxy aromatic aldehyde is salicylaldehyde, although it is understood that salicylaldehyde containing substituent groups which are not too strongly acidic may be employed. A particularly satisfactory substituted salicylaldehyde is 2-hydroxy-3-methoxy benzaldehyde. Other alkoxy substituted salicylaldehydes include those in which the alkoxy radical comprises ethoxy, propoxy, butoxy, pentoxy, hexoxy, etc., although it is a general rule that the methoxy and ethoxy substituted salicylaldehydes are preferred. It is understood that two or more alkoxy radicals may be attached to the same aromatic ring. Other suitable substituent groups attached to the aromatic ring or rings include alkyl, aralkyl, aryl, alkaryl, hydroxy, amino, monoalkylamino, dialkylamino, nitro, halo and particularly bromo, etc. radicals. As hereinbefore set forth the only requirement is that the substituent group will not render the final deactivator too strongly acidic so as to interfere with chelate ring formation. Other ortho-hydroxy aromatic aldehydes include ortho-hydroxy naphthaldehyde and ortho-hydroxy anthraldehyde, which may or may not be substituted in the same manner as hereinbefore set forth.

In accordance with the invention an ortho-hydroxy aromatic aldehyde as above set forth is condensed with an aziridine. The aziridines, as used in the present specification and claims, refer to those derivatives of aziridine which are unsubstituted in the 1-position, that is on the N-atom, and which have at least one hydrogen atom attached to the 2- or 3-carbon atoms of the ring. Suitable aziridines include aziridine (ethylene imine), 2-methylaziridine, 2,2-dimethylaziridine, 1,2-dimethylaziridine, 2-phenylaziridine, 2-cyclohexylaziridine, 2-benzylaziridine, etc.

The condensation of the ortho-hydroxy aromatic aldehyde with the aziridines may be effected in any suitable manner. In general the reaction is readily effected by mixing the two compounds and, after the reaction has been completed, removing the water formed in the reaction, and recovering the final product in any suitable manner. As a rule a catalyst is not necessary but may be employed when desired. It is believed that 1 mol of aldehyde condenses with 1 mol of aziridine and, therefore, equimolar proportions of the reactants will be used, although in some cases an excess of the heterocyclic amine or of the ortho-hydroxy aromatic aldehyde may be utilized.

It is understood that an extensive number of compounds may be prepared and used within the broad scope of the present invention and that, while all these compounds will have some potency as metal deactivators, they necessary will not be of equivalent activity. In general it is preferred that the total number of carbon atoms in the metal deactivator be not greater than about 30, as it has been found that, within certain limits, the potency of the deactivator decreases with inclusion of hydrocarbon radicals of high molecular weight.

The metal deactivators of the present invention are generally utilized in addition to gum inhibitors. The function of the metal deactivator is entirely distinct from the function of the gum inhibitor. For example, the gum inhibitor does not suppress the catalytic action of the metal to any considerable extent and, on the other hand, the metal deactivator does not suppress gum formation per se to any considerable extent, but serves only to deactivate the metal compounds and thereby destroy the catalytic effect thereof to enhance oxidative reactions.

Any suitable gum inhibitor may be employed along with the metal deactivator of the present invention. These gum inhibitors are well known and generally include various phenols, amines, amino phenols, as well as fractions of wood tar oil, etc. Some of these inhibitors are marketed in the form of a solution in a suitable solvent such as alcohol, ether, etc. A particularly suitable gum inhibitor comprises N-N'-di-secondary-butyl-p-phenylene diamine. Another particularly suitable gum inhibitor comprises a mixture of a major proportion of N-n-butyl-p-aminophenol and a minor proportion of N-N'-di-n-butyl-p-phenylene diamine in an alcoholic solvent.

The gum inhibitors are usually added to gasoline in concentrations of from about 0.001% to about 0.01% by weight and the metal deactivator is generally added to gasoline in a smaller concentration which may range from about 0.0005% to about 0.05% by weight. The metal deactivator may be marketed as such or dissolved in a suitable solvent which is not reactive therewith. In some cases, when a solvent is used for the gum inhibitor, the same solvent may be used for the metal deactivator and thus the gum inhibitor and metal deactivator, when desired, may be prepared as a mixture in a suitable solvent and the combined inhibitor and deactivator marketed as a single commodity of a two-fold purpose.

The following example is introduced to further illustrate the novelty and utility of the present invention but not with the intention of unduly limiting the same.

A metal deactivator was prepared as follows: salicylaldehyde was condensed with aziridine (ethylene imine) by mixing the two compounds and, after the reaction has been completed, the water formed was removed. The condensation product was a red oil which is quite soluble in hydrocarbons. The product appears to contain 1 mol of salicylaldehyde per mol of ethylene imine as determined by nitrogen analysis.

The metal deactivator prepared in the above manner was tested in a Pennsylvania cracked gasoline. The results are reported below as induction period in minutes. The induction period is determined by the Oxygen Bomb Stability Test which is the standard method of evaluating the storage stability of gasoline.

The Pennsylvania cracked gasoline used in this test had an induction period of 105 minutes. Upon the addition of 0.005% by weight of a gum inhibitor comprising N-N'-di-secondary butyl-p-phenylene diamine, the induction period was increased to 450 minutes. To show the deleterious effect of metal, copper in the form of copper oleate was added to different samples of the original gasoline and of the gasoline containing gum inhibitor in an amount of 1 milligram of copper per liter of gasoline. Upon the addition of the copper, the original gasoline had an induction period of 55 minutes and the inhibited gasoline had an induction period of 145 minutes. Upon the addition of 0.005% by weight of the above metal deactivator to the gasoline containing gum inhibitor and copper, the induction period was increased to 450 minutes.

It will be noted that the addition of the metal deactivator of the present invention served to suppress the deleterious effect of the added copper and to restore the high induction period of the gasoline containing gum inhibitor.

I claim as my invention:

1. Olefinic gasoline containing a metal compound which normally catalyzes oxidative deterioration and additionally containing, as a metal deactivator, a small mount of the condensation product formed by the mixing of approximately equimolar proportions of an ortho-hydroxy aromatic aldehyde and an aziridine having a hydrogen atom attached in the 1-position.

2. Olefinic gasoline containing a metal compound which normally catalyzes oxidative deterioration and additionally containing, as a metal deactivator, a small amount of the condensation product formed by the mixing of approximately equimolar proportions of salicydaldehyde and ethylene imine.

JOSEPH A. CHENICEK.

REFERENCES CITED

The following references are of record in the file of this patent:

UNITED STATES PATENTS

| Number | Name | Date |
| --- | --- | --- |
| 2,296,225 | Ulrich | Sept. 15, 1942 |
| 2,426,766 | Downing et al. | Sept. 2, 1947 |